(12) United States Patent
Jiang

(10) Patent No.: US 9,877,081 B2
(45) Date of Patent: Jan. 23, 2018

(54) MULTIMODE SET TOP BOX AND MODE MANAGEMENT METHOD THEREFOR, AND COMPUTER STORAGE MEDIUM

(71) Applicant: ZTE CORPORATION, Shenzhen, Guangdong Province (CN)

(72) Inventor: Wei Jiang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/312,186

(22) PCT Filed: Sep. 25, 2014

(86) PCT No.: PCT/CN2014/087460
§ 371 (c)(1),
(2) Date: Jan. 23, 2017

(87) PCT Pub. No.: WO2015/176452
PCT Pub. Date: Nov. 26, 2015

(65) Prior Publication Data
US 2017/0201801 A1    Jul. 13, 2017

(30) Foreign Application Priority Data
May 21, 2014  (CN) .......................... 2014 1 0217114

(51) Int. Cl.
*H04N 5/445* (2011.01)
*H04N 21/485* (2011.01)
(Continued)

(52) U.S. Cl.
CPC ..... *H04N 21/4858* (2013.01); *H04N 21/4221* (2013.01); *H04N 21/42204* (2013.01);
(Continued)

(58) Field of Classification Search
CPC ........... H04N 21/4858; H04N 21/4396; H04N 21/42204; H04N 21/4221; H04N 21/4622; H04N 21/4316
(Continued)

(56) References Cited

U.S. PATENT DOCUMENTS 5,977,963 A    11/1999 Gaughan et al.
8,175,298 B2 *  5/2012 Mitani .................... H04N 5/44
                                                   348/734

(Continued)

FOREIGN PATENT DOCUMENTS

| CN | 101854463 A | 10/2010 |
| CN | 103118299 A | 5/2013 |
| CN | 103491409 A | 1/2014 |

*Primary Examiner* — Michael B Pierorazio
(74) *Attorney, Agent, or Firm* — Ling Wu; Stephen Yang; Ling and Yang Intellectual Property

(57) ABSTRACT

Disclosed is a multimode set top box and a mode management method thereof. The method includes: a multimode set top box using a first play resource to play in a main mode a channel program of a first service system associated with the main mode by default, and using a second play resource to play in an auxiliary mode a channel program of a second service system associated with the auxiliary mode by default; when receiving a mode switching instruction, keeping the first play resource and the second play resource in a non-released state, and keeping an accessing state with the first service system and an accessing state with the second service system; and using the first play resource to play in the auxiliary mode the channel program of the first service system, and using the second play resource to play the channel program of the second service system.

20 Claims, 9 Drawing Sheets

(51) Int. Cl.
*H04N 21/462* (2011.01)
*H04N 21/422* (2011.01)
*H04N 21/431* (2011.01)
*H04N 21/439* (2011.01)

(52) U.S. Cl.
CPC ..... *H04N 21/4316* (2013.01); *H04N 21/4396* (2013.01); *H04N 21/4622* (2013.01)

(58) Field of Classification Search
USPC .......................................................... 725/37
See application file for complete search history.

(56) References Cited

U.S. PATENT DOCUMENTS

| | | | | |
|---|---|---|---|---|
| 8,201,211 B2* | 6/2012 | Proust | ................... | G06F 21/575 707/999.203 |
| 8,351,624 B2* | 1/2013 | Motomura | ............... | H04N 5/60 348/705 |
| 8,838,911 B1* | 9/2014 | Hubin | ...................... | H04N 5/76 711/147 |
| 2006/0161958 A1* | 7/2006 | Choung | ............... | G09G 3/2092 725/80 |
| 2008/0024666 A1 | 1/2008 | Sudo et al. | | |
| 2008/0063216 A1* | 3/2008 | Sakata | ................... | H04R 27/00 381/80 |
| 2008/0244641 A1 | 10/2008 | Ho et al. | | |
| 2010/0315553 A1* | 12/2010 | Takatsuji | ................ | G06F 21/10 348/516 |
| 2010/0321479 A1* | 12/2010 | Yang | .................. | H04N 13/0051 348/51 |
| 2011/0051002 A1* | 3/2011 | Oh | ........................ | H04N 5/765 348/569 |
| 2011/0068736 A1* | 3/2011 | Chartier | ................ | H02J 7/0052 320/107 |
| 2011/0113442 A1* | 5/2011 | Kikkawa | ................ | G09G 5/006 725/25 |
| 2011/0134338 A1* | 6/2011 | Toba | ..................... | H04L 12/282 348/734 |
| 2011/0142245 A1* | 6/2011 | Toba | ................ | G11B 20/10527 381/22 |
| 2011/0176057 A1* | 7/2011 | Okamura | ................. | H04N 5/44 348/554 |
| 2011/0234916 A1* | 9/2011 | Fujita | ....................... | H04N 5/60 348/738 |
| 2012/0002562 A1* | 1/2012 | Kawade | ................. | H04N 5/765 370/252 |
| 2012/0030728 A1* | 2/2012 | Yukawa | ............ | H04N 21/4432 725/151 |
| 2012/0136612 A1* | 5/2012 | Vanderhoff | ............ | H04N 5/765 702/119 |
| 2012/0188456 A1* | 7/2012 | Kuroyanagi | ........... | H04N 5/765 348/569 |
| 2012/0307157 A1* | 12/2012 | Utsunomiya | .......... | H04N 5/775 348/707 |
| 2013/0051578 A1* | 2/2013 | Chu | ...................... | H04B 15/00 381/94.1 |
| 2013/0223538 A1* | 8/2013 | Wang | ................ | H04N 21/4307 375/240.25 |
| 2013/0292311 A1* | 11/2013 | Shaw | ..................... | E03F 5/042 210/121 |
| 2014/0193134 A1* | 7/2014 | Maeda | ............ | G11B 20/10009 386/231 |
| 2015/0077633 A1* | 3/2015 | Lee | .................... | H04N 21/4307 348/515 |
| 2015/0249856 A1* | 9/2015 | Pereira | ............ | H04N 21/42615 725/70 |

\* cited by examiner

MULTIMODE SET TOP BOX AND MODE MANAGEMENT METHOD THEREFOR, AND COMPUTER STORAGE MEDIUM

TECHNICAL FIELD

The present document relates to a communication technology, in particular to a multimode Set Top Box (STB), a mode management method thereof and a computer storage medium.

BACKGROUND OF THE RELATED ART

A Digital Video Broadcasting (DVB) system is a universal digital television system, and the way of conversion between various transmission modes in this system is simple to guarantee the universality. DVB standards provide a set of complete digital television system specifications which are applicable to different mediums. A DVB digital broadcasting transmission system uses all universal television broadcasting transmission mediums including satellite televisions, cable televisions, terrestrial televisions, Satellite Master Antenna TeleVision (SMATV) and MNDSD, DVB standards are DVB-S, DVB-C, DVB-T, DVB-SMATV, DVB-MS and DVB-MC, and the DVB system is carried on a digital television network.

IPTV, i.e., Internet Protocol Television, is a brand new technology that uses a broadband cable television network, is integrated with techniques such as Internet, multimedia and communication and provides multiple interactive services including digital television to home users. An IPTV system is carried on an Internet Protocol (IP) network.

Over The Top (OTT) refers to a service that is provided by an operator and operates "over" the Internet. This service has the most typical feature that an OTT service provider does not need to have its own physical network and can directly operate on an Internet physical network of the operator, and a set top box can be docked to an Internet video platform and can play and control a program.

With the development of services such as DVB, IPTV and OTT, the multimode set top box which supports these services simultaneously emerges at the right moment; the multimode set top box is integrated with a hardware structure and a software layer which support a digital television network and an IP network, adopts the same processing chip to perform processing to information such as digital television signals and IP content, and supports realizing integration of different services on the same platform by using the same remote controller. To speak it simply, one (set top box) is used for multiple purposes (supporting multiple services).

Under a situation that the set top box supports playing channel programs in multiple modes, there is no effective solution in the related art to solve the problem of how to rapidly and flexibly switch the mode of the set top box to improve user experience.

SUMMARY OF THE INVENTION

In view of this, the embodiments of the present document provide a multimode set top box, a mode management method thereof and a computer storage medium which can rapidly and flexibly switch the mode of the set top box and improve the user experience.

The technical solution of the embodiments of the present document is implemented as follows:

In a first aspect, an embodiment of the present document provides a mode management method, including:

a multimode set top box using a first play resource to play in a main mode a channel program of a first service system associated with the main mode by default, and using a second play resource to play in an auxiliary mode a channel program of a second service system associated with the auxiliary mode by default, wherein the number of service systems that are associated with the auxiliary mode by default is one or more;

when receiving a mode switching instruction, keeping the first play resource and the second play resource in a non-released state, and keeping an accessing state with the first service system and an accessing state with the second service system; and using the first play resource to play in the auxiliary mode the channel program of the first service system, and using the second play resource to play in the main mode the channel program of the second service system.

Alternatively, using the first play resource to play in the main mode the channel program of the first service system associated with the main mode by default includes:

using the first play resource to play in a mode of a full-screen window the channel program of the first service system.

Alternatively, using the second play resource to play in the auxiliary mode the channel program of the second service system associated with the auxiliary mode by default includes:

using the second play resource to play in a mode of a new window in a full-screen window the channel program of the second service system, or play in a mode of splitting a full-screen window the channel program of the second service system, wherein, a display area of the new window is smaller than a display area of the full-screen window.

Alternatively, when receiving the mode switching instruction, the method further includes:

determining that the main mode is associated with the second service system currently and determining that the auxiliary mode is associated with the first service system currently.

Alternatively, before using the second play resource to play in the auxiliary mode the channel program of the second service system associated with the auxiliary mode by default, the method further includes:

receiving a first instruction, wherein the first instruction is used for instructing using the second play resource to play in the auxiliary mode the channel program of the second service system associated with the auxiliary mode by default, wherein a triggering mode of the first instruction includes at least one of the following:

triggering through a specific key of a remote controller;

triggering by calling out a setting page of the multimode set top box;

triggering through a specific key on a front panel of the multimode set top box.

Alternatively, a triggering mode of the mode switching instruction includes at least one of the following:

triggering through a specific key of a remote controller;

triggering by calling out a setting page of the multimode set top box;

triggering through a specific key on a front panel of the multimode set top box.

Alternatively, when using the first play resource to play in the auxiliary mode the channel program of the first service system, and using the second play resource to play in the main mode the channel program of the second service system, the method further includes:

judging whether a channel program corresponding to a current to-be-played transport stream corresponds to the channel program of the second service system which is played in the main mode, and when the channel program corresponding to the current to-be-played transport stream corresponds to the channel program of the second service system which is played in the main mode, setting a volume of the transport stream played currently to a conventional volume; and when the channel program corresponding to the current to-be-played transport stream does not correspond to the channel program of the second service system which is played in the main mode, setting the volume of the transport stream played currently to be mute.

In a second aspect, an embodiment of the present document further provides a multimode set top box, including:

a first play unit, arranged to use a first play resource to play in a main mode a channel program of a first service system associated with the main mode by default, and use a second play resource to play in an auxiliary mode a channel program of a second service system associated with the auxiliary mode by default, wherein the number of service systems that are associated with the auxiliary mode by default is one or more;

a switching unit, arranged to, when receiving a mode switching instruction, keep the first play resource and the second play resource in a non-released state, and keep an accessing state with the first service system and an accessing state with the second service system; and a second play unit, arranged to use the first play resource to play in the auxiliary mode the channel program of the first service system, and use the second play resource to play in the main mode the channel program of the second service system.

Alternatively, the first play unit is further arranged to use the first play resource to play in a mode of a full-screen window the channel program of the first service system.

Alternatively, the first play unit is further arranged to use the second play resource to play in a mode of a new window in a full-screen window the channel program of the second service system, or play in a mode of splitting a full-screen window the channel program of the second service system, wherein, a display area of the new window is smaller than a display area of the full-screen window.

Alternatively, the switching unit is further arranged to, when receiving the mode switching instruction, determine that the main mode is associated with the second service system currently and determine that the auxiliary mode is associated with the first service system currently.

Alternatively, the multimode set top box further includes: a receiving unit arranged to receive a first instruction, wherein the first instruction is used for instructing using the second play resource to play in the auxiliary mode the channel program of the second service system associated with the auxiliary mode by default; and trigger the first play unit to use the second play resource to play in the auxiliary mode the channel program of the second service system associated with the auxiliary mode by default, wherein the first instruction includes:

a first instruction triggered through a specific key of a remote controller;

a first instruction triggered by calling out a setting page of the multimode set top box;

a first instruction triggered through a specific key on a front panel of the multimode set top box.

Alternatively, the mode switching instruction includes:

a mode switching instruction triggered through a specific key of a remote controller;

a mode switching instruction triggered by calling out a setting page of the multimode set top box;

a mode switching instruction triggered through a specific key on a front panel of the multimode set top box.

Alternatively, the multimode set top box further includes:

a judgment unit arranged to, when the second play unit uses the first play resource to play in the auxiliary mode the channel program of the second service system and uses the second play resource to play in the main mode the channel program of the first service system, judge whether a channel program corresponding to a current to-be-played transport stream corresponds to the channel program of the second service system which is played in the main mode, and when the channel program corresponding to the current to-be-played transport stream corresponds to the channel program of the second service system which is played in the main mode, set a volume of the transport stream played by the second play unit currently to a conventional volume; and when the channel program corresponding to the current to-be-played transport stream does not correspond to the channel program of the second service system which is played in the main mode, set the volume of the transport stream played by the second play unit currently to be mute.

In a third aspect, an embodiment of the present document provides a computer storage medium that stores computer-executable instructions used for executing at least one of the methods provided by the embodiment of the present document in the first aspect.

In the embodiments of the present document, it is realized that channel programs of multiple service systems are played simultaneously in different modes. As compared with the related art, a processing flow caused by a reason that a system needs to be accessed again due to mode switching and a processing flow of re-allocating play resources are saved, high-efficiency and rapid switching of channel programs of multiple service systems between different modes can be realized, convenience is provided to users to view different channel programs, the mode management in multiple modes (including mode switching, and stopping playing a channel program in an auxiliary mode) is supported, the optimization of functions of the set top box is realized, and the user experience is improved.

PREFERRED EMBODIMENTS OF THE INVENTION

The preferred embodiments of the present document will be described below in detail with reference to the drawings. It should be understood that the preferred embodiments described below are merely for describing and explaining the present document instead of limiting the present document.

A mode management method recorded by an embodiment of the present document will be described below in combination with a scenario when a set top box is powered on. In the embodiment of the present document, a multimode set top box supports playing channel programs of different service systems simultaneously in multiple modes including a main mode and an auxiliary mode, and the multimode set top box supports playing in the main mode a channel program of a service system 1 and playing in the auxiliary mode a channel program of a service system 2. Herein, it is configured by default that the multimode set top box plays in the auxiliary mode the channel program of the service system 1 (i.e., the main mode is associated with the service system 1 by default) and plays in the auxiliary mode the channel program of the service system 2 (i.e., the auxiliary mode is associated with the service system 2 by default); and of course, in actual application, the multimode set top box may also play in the auxiliary mode the channel programs of multiple service systems (i.e., the auxiliary mode may be associated with multiple service systems).

Figure 1A:
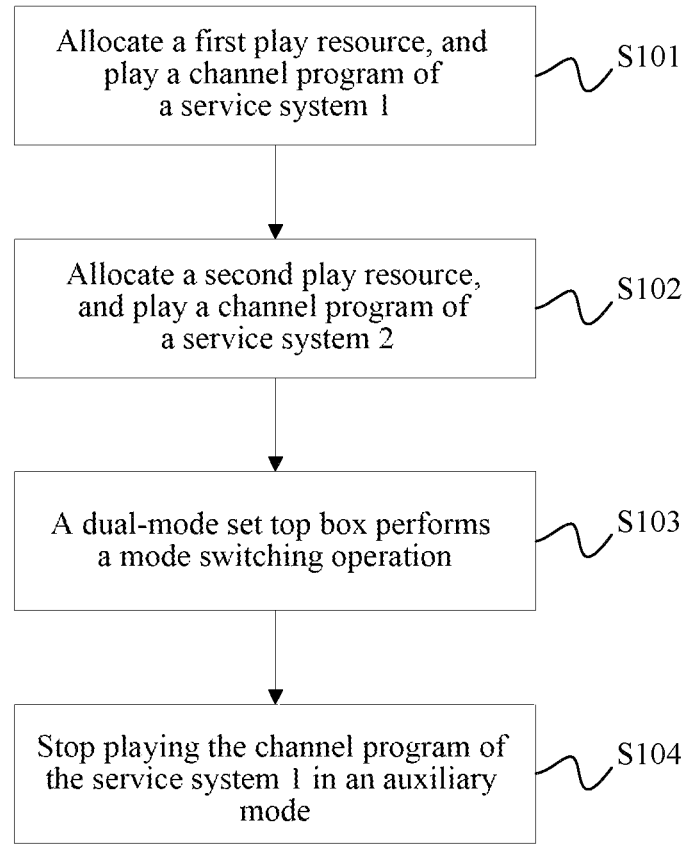
FIG. 1a illustrates a flow chart of implementing a mode management according to an embodiment of the present document.

FIG. 1a illustrates a flow chart of implementing a mode management method in according to an embodiment of the present document. As illustrated in FIG. 1, the mode management method includes the following steps:

In step S101, after a multimode set top box is powered on, the multimode set top box allocates a first play resource for playing a channel program of a service system 1 associated with a main mode by default, and uses the allocated first play resource to play in the main mode the channel program of the service system 1.

Figure 1B:
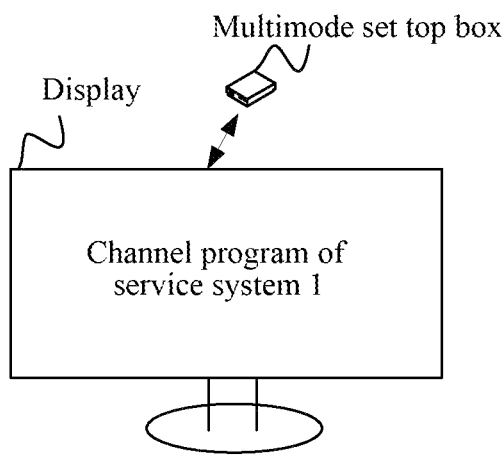
FIG. 1b illustrates a schematic diagram I of a multimode set top box controlling a display for displaying according to an embodiment of the present document.

In step S101, the operation that the multimode set top box plays in the main mode the channel program of the service system 1 refers to that the multimode set top box controls a display to play in the main mode 1 the channel program of the service system 1; and as one implementation mode, as illustrated in FIG. 1b, when the multimode set top box plays in the main mode the channel program of the service system 1, the multimode set top box may control the display to play in a mode of a full-screen window the channel program of the service system 1.

In step S101, when the multimode set top box allocates the play resource for playing the channel program of the service system 1, the multimode set top box further accesses the service system 1 that is associated with the main mode by default, and the multimode set top box receives multimedia data (e.g., audio/video code streams) of the service system 1 according to a protocol provided by the related technology and plays the multimedia data, the process of which is not repetitively described here.

In step S102, the multimode set top box allocates a second play resource for playing a channel program of a service system 2 associated with an auxiliary mode by default, and uses the allocated second play resource to play in the auxiliary mode the channel program of the service system 2.

Step S102 is the processing performed when the multimode set top box displays the channel program corresponding to the main mode (corresponding to the service system 1) in a full screen and receives an instruction of playing in the auxiliary mode the channel program of the service system 2. By adopting the above-mentioned mode, convenience can be provided for users to view the channel program of the service system 2 when the users view the channel program of the service system 1.

In step S102, when the multimode set top box allocates the play resource for playing the channel program of the service system 2, the multimode set top box further accesses the service system 2 that is associated with the auxiliary mode by default, and the multimode set top box receives multimedia data of the service system 2 according to a protocol provided by the related technology and plays the multimedia data, the process of which is not repetitively described here.

The play resources in step S101 and step S102 refer to hardware resources (including internal memories and CPU) used when the set top box plays the channel programs; since the modes (main mode and auxiliary mode) used by the multimode set top box correspond to services one to one and the services also correspond to the service systems one to one, the modes used by the multimode set top box also correspond to the service systems one to one, and the services include an IPTV service and an OTT service; and the service systems include an IPTV service system and an OTT service system.

Figure 1C:
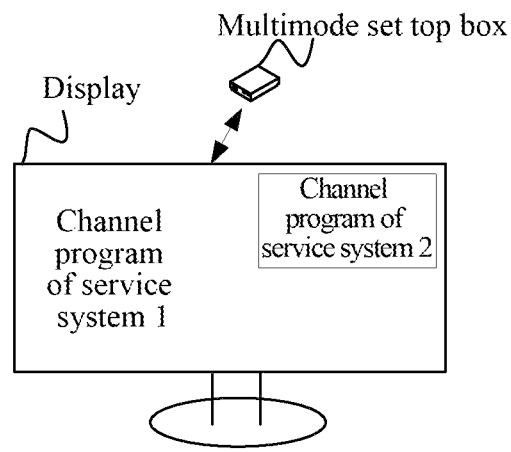
FIG. 1c illustrates a schematic diagram II of a multimode set top box controlling a display for displaying according to an embodiment of the present document.

In step S102, when the multimode set top box plays in the main mode the channel program of the service system 1 and plays in the auxiliary mode the channel program of the service system 2, as an example, as illustrated in FIG. 1c, the multimode set top box may control the display to play in a mode of a new window the channel program of the service system 2. A display area of the new window is smaller than a display area of a full-screen display window of the display, and the position of the new window may be preset and may also be determined according to the instruction (which may carry the position information of the new window), received before step S102, of displaying the channel program of the service system 2.

Figure 1D:
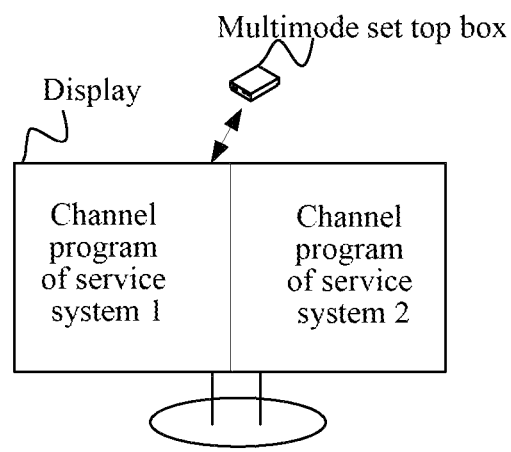
FIG. 1d illustrates a schematic diagram III of a multimode set top box controlling a display for displaying according to an embodiment of the present document.

When the multimode set top box plays in the main mode the channel program of the service system 1 and plays in the auxiliary mode the channel program of the service system 2, as an example, as illustrated in FIG. 1d, the multimode set top box may control the display for display in a split-screen mode the channel program of the service system 1 and the channel program of the service system 2.

In step S103, the multimode set top box performs a mode switching operation.

The first play resource and the second play resource are kept in a non-released state, and an accessing state with the service system 1 and an accessing state with the service system 2 are kept; and the channel program of the service system 2, which is played in the auxiliary mode before step S103, is played in the main mode, and the channel program of the service system 1, which is played in the main mode before step S103, is played in the auxiliary mode.

Figure 1E:
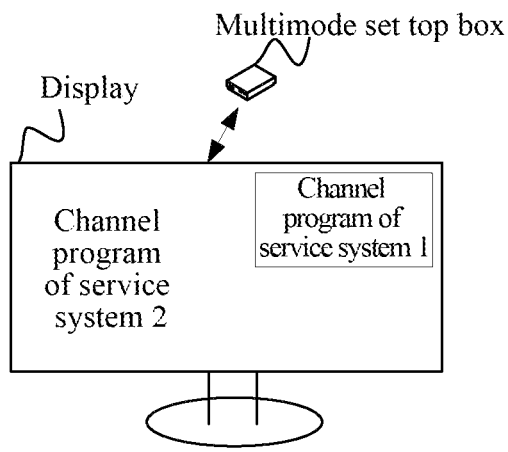
FIG. 1e illustrates a schematic diagram IV of a multimode set top box controlling a display for displaying according to an embodiment of the present document.
Figure 1F:
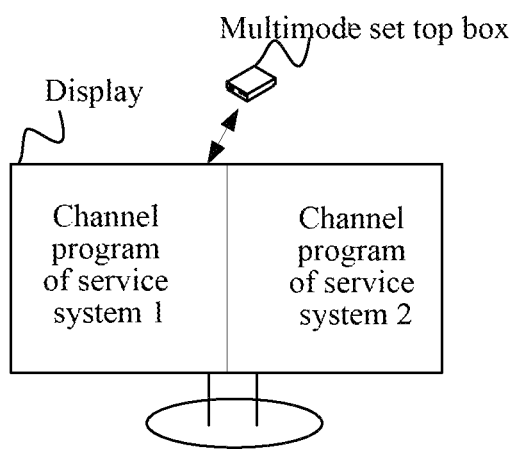
FIG. 1f illustrates a schematic diagram V of a multimode set top box controlling a display for displaying according to an embodiment of the present document.

Since the multimode set top box plays in the mode of the new window the channel program of the service system 2 before step S103 and plays in the main mode the channel program of the service system 1, and correspondingly, in step S103, the multimode set top box plays in the main mode the channel program of the service system 2 and plays in the auxiliary mode the channel program of the service system 1, a schematic diagram when the multimode set top box controls the display for display after mode switching is as illustrated in FIG. 1e, the channel program of the service system 2 is played in a full-screen window and the channel program of the service system 1 is displayed in the mode of the new window; and another schematic diagram when the multimode set top box controls the display for display after mode switching is as illustrated in FIG. 1f, and the channel program of the service system 2 and the channel program of the service system are played in split screens.

Step S103 is the processing performed when the multimode set top box receives the mode switching instruction.

It needs to be pointed out that the embodiment of the present document is described by taking the circumstance that the auxiliary mode is associated with the service system 2 by default as an example, the auxiliary mode may correspond to multiple service systems in actual application, e.g., when the auxiliary mode is further associated with a service system 3 by default, the mode switching instruction received by the multimode set top box may carry a parameter that may instruct playing in the main mode the channel program of one of the service system 2 and the service system 3; and of course, when the mode switching instruction does not carry the parameter, the multimode set top box may randomly select to play in the main mode the channel program of the service system 2 or the service system 3, and play in the auxiliary mode the channel program of the service system 1.

It also needs to be pointed out that the multimode set top box always keeps accessing the service system 1 and the service system 2 when step S103 is being executed. As compared with a processing mode of firstly disconnecting the access and then performing accessing again, the mode switching speed can be obviously improved and the user experience is guaranteed to be good.

It also needs to be pointed out that, when the service system 1 is associated with the main mode by default, the auxiliary mode is associated with the service system 2 by default and the multimode set top box switches the play mode of the channel programs of the service system 1 and the service system 2, the play resources allocated for the main mode and the auxiliary model may be kept. As compared with a processing mode of firstly releasing the play resources and then reallocating the play resources, the mode switching speed can be obviously improved and the user experience is guaranteed to be good.

In step S104, the multimode set top box stops playing in the auxiliary mode the channel program of the service system 1 and releases the play resource corresponding to the service system 1.

Step S104 is an operation performed when the multimode set top box receives an instruction of stopping playing in the auxiliary mode the channel program of the service system 1; and since mode switching is performed in step S103 and the current auxiliary mode is associated with the service system 1, the play resource corresponding to the service system 1 is released and the multimode set top box may also release the access to the service system 1.

Figure 1G:
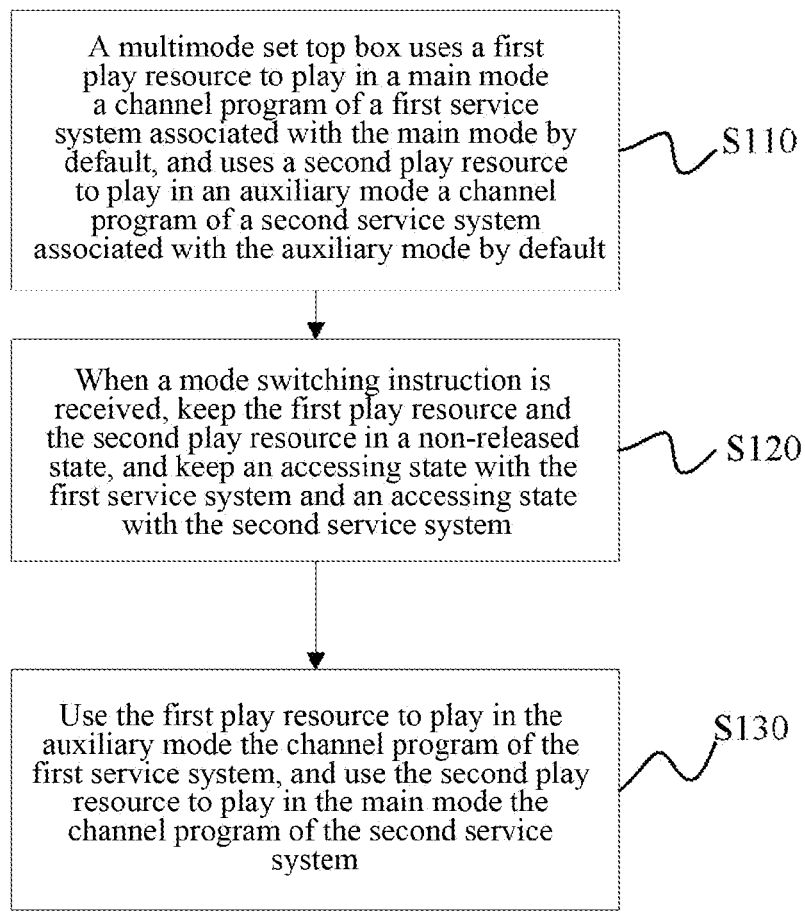
FIG. 1g illustrates a schematic diagram VI of a multimode set top box controlling a display for displaying according to an embodiment of the present document.

FIG. 1g illustrates another embodiment of the mode management method of the present document. The method includes:

In step S110, a multimode set top box uses a first play resource to play in a main mode a channel program of a first service system that is associated with the main mode by default, and uses a second play resource to play in an auxiliary mode a channel program of a second service system that is associated with the auxiliary mode by default, wherein the number of the service systems that are associated with the auxiliary mode by default is one or more.

In step S120, when a mode switching instruction is received, the first play resource and the second play resource are kept in a non-released state, and an accessing state with the first service system and an accessing state with the second service system are kept.

In step S130, the first play resource is used to play in the auxiliary mode the channel program of the first service system and the second play resource is used to play in the main mode the channel program of the second service system.

Before the switching instruction is not received, the set top box uses the first play resource to play in the main mode the channel program of the first service system and uses the second play resource to play in the auxiliary mode the channel program of the second service system; after the corresponding switching instruction is received, the set top box uses the first play resource to play in the auxiliary mode the channel program of the first service system and uses the second play resource to play in the main mode the channel program of the second service system; accordingly, it can be seen that, in the mode management method provided by this embodiment, only the play modes of the channel program of the first service system and the channel program of the second service system are switched, which is different from the prior art in which the play resources and the accessed state of the service systems are further switched at the same time due to the switching of the play modes; the mode management operation and the resource reallocation are obviously simplified.

The embodiment of the present document further provides a computer storage medium storing computer-executable instructions used for executing the mode management method illustrated in FIG. 1a.

Figure 2:
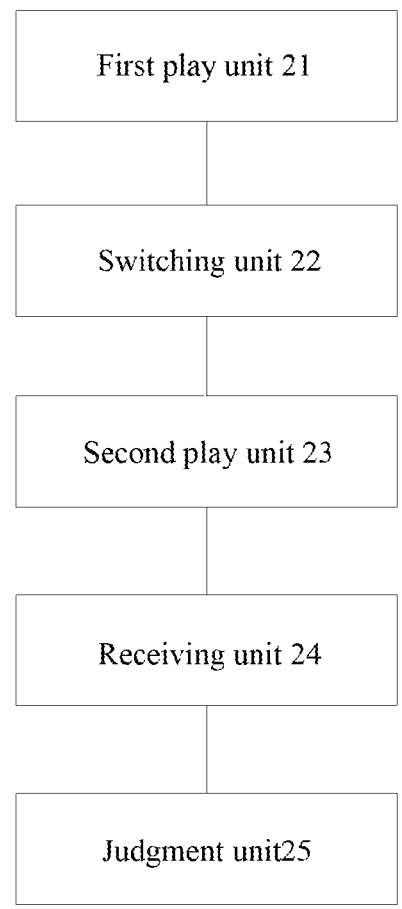
FIG. 2 illustrates a structural schematic diagram of a multimode set top box according to an embodiment of the present document.

The embodiment of the present document further records a multimode set top box. As illustrated in FIG. 2, the multimode set top box includes:

a first play unit 21 arranged to use a first play resource to play in a main mode a channel program of a first service system that is associated with the main mode by default, and use a second play resource to play in an auxiliary mode a channel program of a second service system that is associated with the auxiliary mode by default, wherein the number of the service systems that are associated with the auxiliary mode by default is one or more;

a switching unit 22 arranged to, when receiving a mode switching instruction, keep the first play resource and the second play resource in a non-released state, and keep an accessing state with the first service system and an accessing state with the second service system; and a second play unit 23 arranged to use the first play resource to play in the auxiliary mode the channel program of the second service system, and use the second play resource to play in the main mode the channel program of the first service system.

The first play unit 21 and the second play unit 22 each include a display and a controller for controlling the display to play the channel program; and the first play unit 21 and the second play unit 22 are integrated to correspond to the same display and controller. The display may include a structure such as a liquid crystal display, a projection display, an Organic Light Emitting Diode (OLED) display, a plasma display, etc.

The controller may be an Application Processor (AP), a Micro Control Unit (MCU), a digital signal processor, a Programmable Logic Controller (PLC) or the like; the controller may specifically be a structure such as an image processor or the like; and the controller is used for controlling the display unit to play in the main mode or in the auxiliary mode the channel program.

Herein, the first play unit 21 is further arranged to use the first play resource to play in a mode of a full-screen window the channel program of the first service system.

Herein, the first play unit 21 is further arranged to use the second play resource to play in a mode of a new window in the full-screen window the channel program of the second service system, or play in a mode of splitting the full-screen window the channel program of the second service system, wherein, a display area of the new window is smaller than a display area of the full-screen window.

Herein, the switching unit 22 is further arranged to, when receiving the mode switching instruction, determine that the main mode is associated with the second service system currently and determine that the auxiliary mode is associated with the first service system currently.

Herein, the multimode set top box further includes: a receiving unit 24 arranged to receive a first instruction, the first instruction being used for instructing using the second play resource to play in the auxiliary mode the channel program of the second service system that is associated with the auxiliary mode by default, and trigger the first play unit 21 to use the second play resource to play in the auxiliary mode the channel program of the second service system that is associated with the auxiliary mode by default, wherein a triggering mode of the first instruction includes: triggering through a specific key of a remote controller; triggering by calling out a setting page of the multimode set top box; and triggering through a specific key on a front panel of the multimode set top box. In other words, the first instruction includes: a first instruction triggered through a specific key of a remote controller; a first instruction triggered by calling out a setting page of the multimode set top box; and a first instruction triggered through a specific key on a front panel of the multimode set top box.

A triggering mode of the mode switching instruction includes: triggering through a specific key of a remote controller; triggering by calling out a setting page of the multimode set top box; and triggering through a specific key on a front panel of the multimode set top box. In other words, the switching instruction may include: a switching instruction triggered through a specific key of a remote controller; a switching instruction triggered by calling out a setting page of the multimode set top box; and a switching instruction triggered through a specific key on a front panel of the multimode set top box.

The specific structure of the receiving unit 21 may be different according to different structures that receive the first instruction and/or switching instruction, and specifically may be a structure such as a remote controller, a controller of the set top box or a key on the set top box.

Herein, the multimode set top box further includes: a judgment unit 25 arranged to, when the second play unit 23 uses the first play resource to play in the auxiliary mode the channel program of the first service system and uses the second play resource to play in the main mode the channel program of the second service system, judge whether a channel program corresponding to a current to-be-played transport stream corresponds to the channel program of the second service system which is played in the main mode, and if yes, set a volume of a transport stream played by the second play unit 23 currently to a conventional volume; and otherwise, set the volume of the transport stream played by the second play unit 23 currently to be mute.

In actual application, the first play unit 21 and the second play unit 23 in the multimode set top box may be implemented through a decoder in the multimode set top box; and the switching unit 22, the receiving unit 24 and the judgment unit 25 may be implemented through a Central Processing Unit (CPU), a Digital Signal Processor (DSP) or a Field Programmable Gate Array (FPGA) in the multimode set top box.

Figure 3:
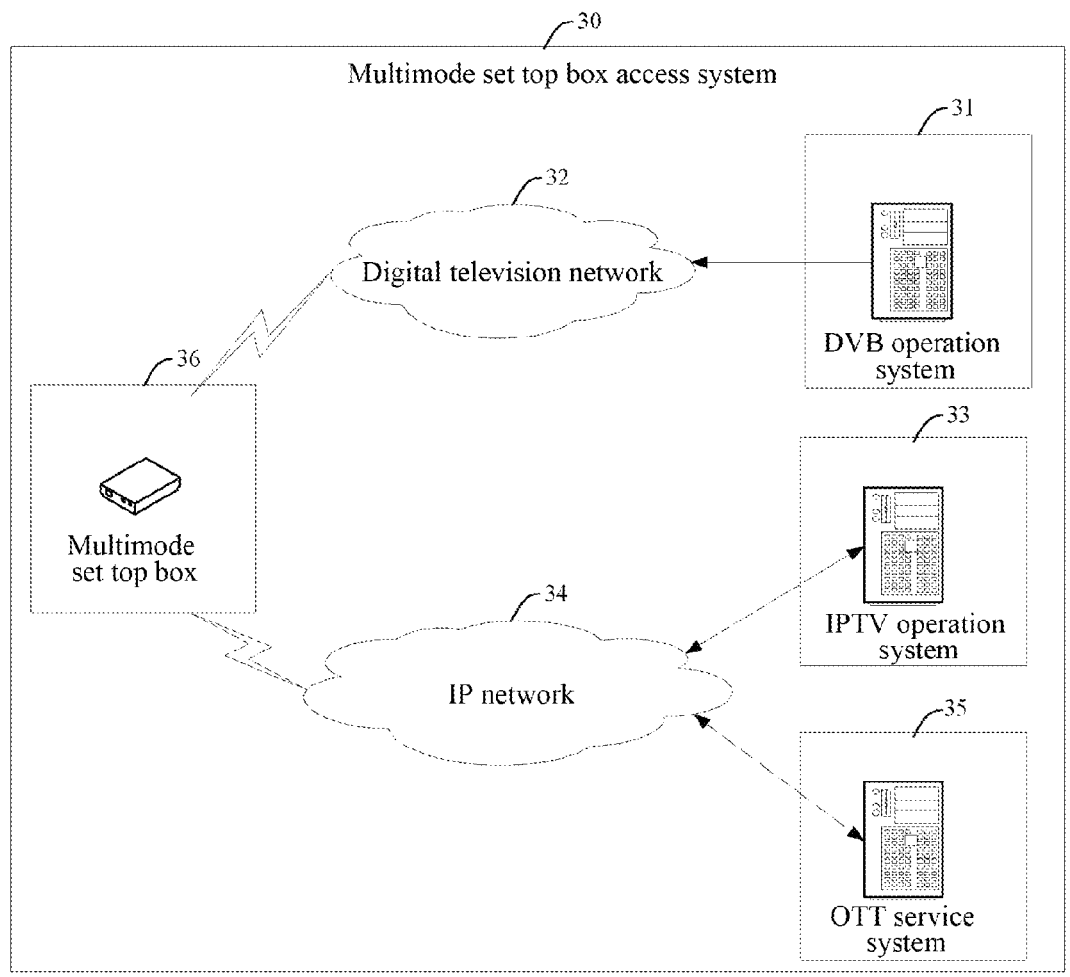
FIG. 3 illustrates a topological schematic diagram of an access system of a multimode set top box according to an embodiment of the present document.

A description will be made below in combination with actual application scenarios. After the set top box accesses a system of multiple services, a topological schematic diagram of a formed access system 30 is as illustrated in FIG. 3, and the access system 30 includes: a DVB operation system 31, a digital television network 32, an IPTV operation system 33, an IP network 34, an OTT service system 35 and a multimode set top box 36, wherein, the DVB operation system 31 transmits broadcasting television signals to the multimode set top box 36 through the digital television network 32, and the multimode set top box 36 may acquire multimedia data of channel programs from a transport stream of the broadcasting television signals and play the channel programs.

The IPTV operation system 33 and the OTT service system 35 may each perform bidirectional interaction with the multimode set top box 36 through the IP network 34, the multimode set top box 36 acquires relevant information of the channel programs from the IPTV operation system 33 or the OTT service system 35 through the IP network, and receives code streams (including video code streams and/or audio code streams) of the channel programs through the IP network and decodes and plays the code streams, and the code streams of the channel programs may be acquired over the IP network through protocols such as Real Time Streaming Protocol (RTSP) addresses, an Internet Group Management Protocol (IGMP) and a Hyper Text Transport Protocol (HTTP).

In the embodiment of the present document, after the multimode set top box 36 is powered on, the multimode set top box 36 may simultaneously access the DVB operation system 31, the IPTV operation system 33 and the OTT service system 35, reducing time and resource consumption caused by a reason that the subsequent mode switching requires an access to the system again, thereby enabling a more efficient subsequent mode switching operation.

Figure 4:
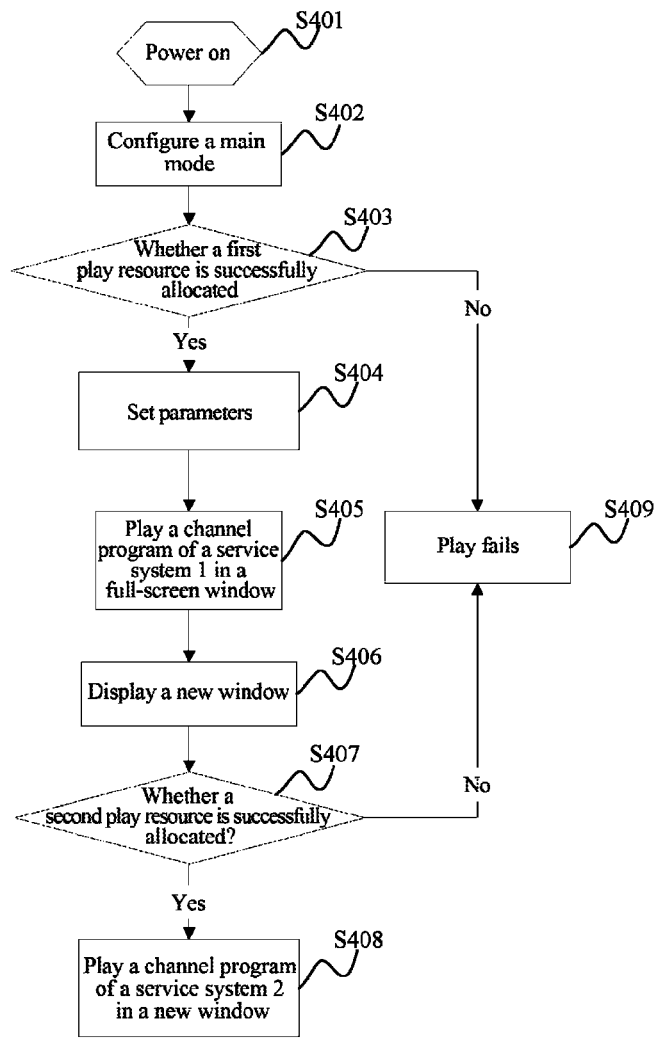
FIG. 4 illustrates a flow chart of implementing a multimode set top box playing channel programs simultaneously in two modes according to an embodiment of the present document.

An implementation process of the multimode set top box 36 playing a program simultaneously in two modes will be described below. As illustrated in FIG. 4, the implementation process of the multimode set top box 36 playing the channel program simultaneously in two modes includes the following steps:

In step S401, the multimode set top box 36 is powered on and then simultaneously accesses multiple service systems.

The service systems include the DVB operation system, the OTT operation system and the IPTV operation system illustrated in FIG. 3.

In step S402, the multimode set top box 36 configures a main mode.

The multimode set top box 36 reads the mode configuration. Here, provided that the mode configuration indicates that a main mode is associated with a system 1 by default and an auxiliary mode is associated with a service system 2 by default.

In step S403, before the multimode set top box 36 uses the main mode to play a channel program, the multimode set top box 36 needs to allocate a first play resource for playing the channel program of the service system 1 (equivalent to setting a play channel), if the allocation of the play resource fails, the process turns to step S409, and if the allocation of the play resource succeeds, the process turns to step S404.

In step S404, the multimode set top box 36 sets relevant parameters for playing the channel program of the service system 1.

For example, the multimode set top box 36 may set to adopt a mode of a full-screen window when the channel program of the service system 1 is played in the main mode, and may also set to adopt a mode of a new window when the channel program of the service system 1 is played in the auxiliary mode, and set a position of the new window in the full-screen window.

In step S406, the multimode set top box 36 uses the first play resource to play the channel program of the service system 1 in a full-screen window.

In step S406, the multimode set top box 36 displays a new window.

When the multimode set top box 36 receives a first instruction of playing in the auxiliary mode the channel program of the service system 2, step S406 is performed; and the new window is used for playing the channel program of the service system 2, and a triggering mode of the first instruction includes:

triggering through a specific key of a remote controller to open a new window;

triggering by calling out a setting page of the multimode set top box 36; and triggering through a specific key on a front panel of the multimode set top box 36.

In step S407, since the first play resource has already been used for playing the channel program of the service system 1, a second play resource needs to be allocated for playing the channel program of the service system 2 (equivalent to setting a play channel), if the allocation of the second play resource fails, the process turns to step S409, and if the allocation of the second play resource succeeds, the process turns to step S408.

In step S408, the second play resource is used to play the channel program of the service system 2 in the new window.

In step S409, the multimode set top box 36 prompts for the failure to play the channel program.

In an interface displayed by a controlled display of the multimode set top box 36, the channel program of the service system 1 corresponding to the current main mode is in a state of receiving operation by default.

Figure 5:
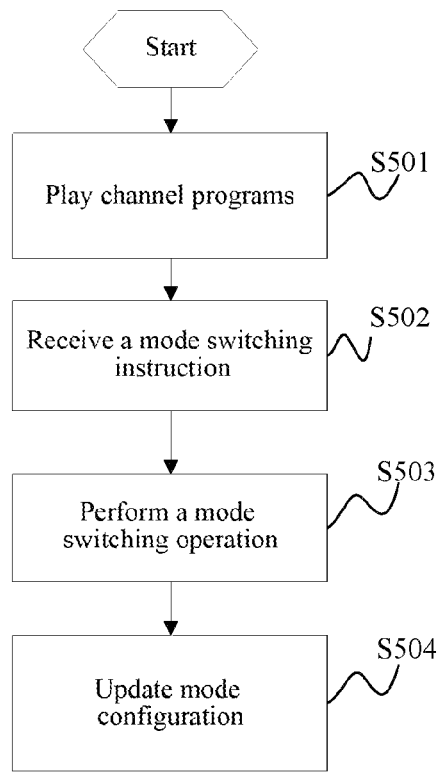
FIG. 5 illustrates a flow chart of implementing a multimode set top box performing mode switching according to an embodiment of the present document.

An implementation process of mode switching performed by the multimode set top box 36 will be described below. As illustrated in FIG. 5, the implementation process of mode switching performed by the multimode set top box 36 includes the following steps:

In step S501, a multimode set top box 36 is playing in a main mode a channel program of a service system 1 and playing in an auxiliary mode a channel program of a service system 2.

In step S502, the multimode set top box 36 receives an instruction of being triggered to perform mode switching.

The mode switching instruction may be triggered through the following modes:

triggering by triggering the multimode set top box 36 through a specific key of a remote controller;

triggering by calling out a mode selection page, displayed in a display, of the multimode set top box 36; and triggering through a specific key of the multimode set top box 36.

In step S503, the multimode set top box 36 performs a mode switching operation.

Step S503 may be implemented through the following steps:

In step S5031, the channel program of the service system 1 is played in the auxiliary mode.

In step S5032, the channel program of the service system 2 is played in the main mode.

The execution sequence of step S5031 and step S5032 may be reversed to guarantee the smoothness of playing the channel program and improve the visual experience of the user.

In step S504, the mode configuration is updated: the main mode is set to be associated with the service system 2 and the auxiliary mode is set to be associated with the service system 1.

In an interface displayed by the controlled display of the multimode set top box 36, the channel program of the service system 2 corresponding to the current main mode is in a state of receiving operation be default.

Figure 6:
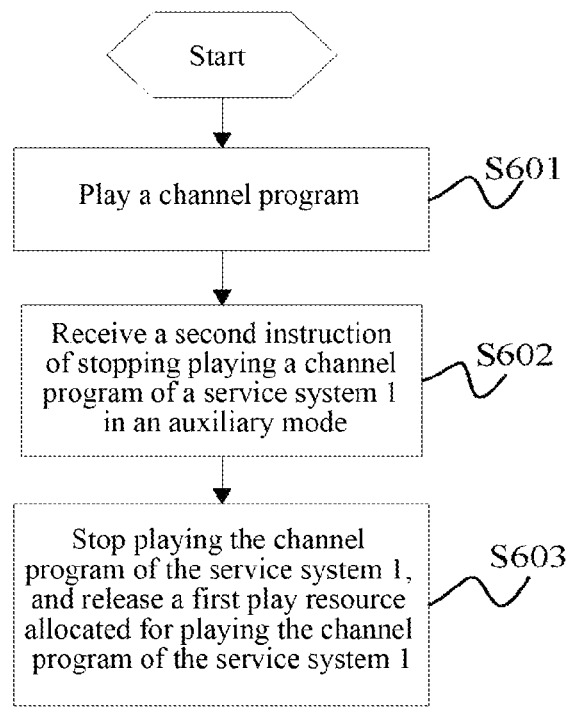
FIG. 6 illustrates a flow chart of implementing a multimode set top box stopping playing a channel program in an auxiliary mode according to an embodiment of the present document.

An implementation process of the multimode set top box 36 stopping playing the channel program in the auxiliary mode will be described below. As illustrated in FIG. 6, the implementation process includes the following steps:

In step S601, a multimode set top box 36 plays in a main mode a channel program of a service system 2 and plays in an auxiliary mode a channel program of a service system 1.

In step S602, a second instruction of stopping playing in the auxiliary mode the channel program of the service system 1 is received.

When a mode of a new window is adopted to play in the auxiliary mode the channel program of the service system 1, the user may close the new window through the following modes to trigger the multimode set top box 36 to stop playing in the auxiliary mode the channel program of the service system 1:

closing the new window through a specific key of a remote controller;

closing the new window by calling out a setting page, displayed in a display, of the multimode set top box 36; and closing the new window through a specific key on a front panel of the multimode set top box 36.

In step S603, the play of the channel program of the service system 1 is stopped, and the first play resource allocated for playing the channel program of the service system is released.

Figure 7:
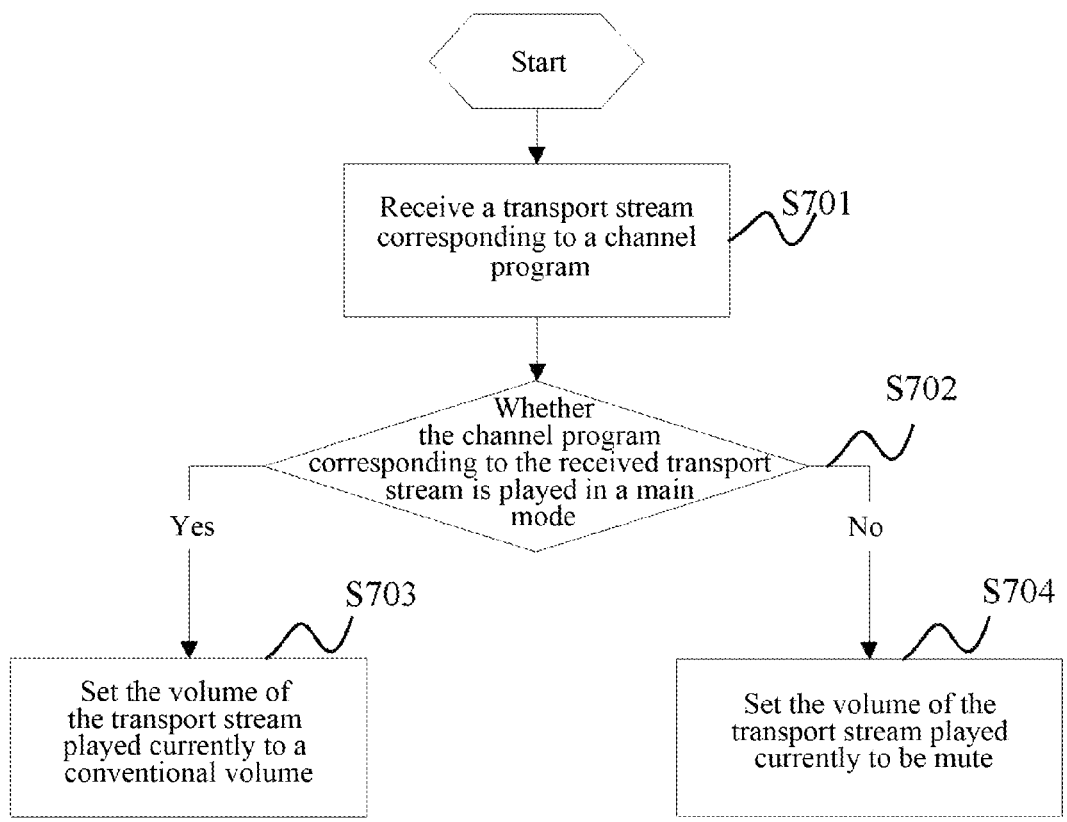
FIG. 7 illustrates a flow chart of an audio processing when a multimode set top box performs mode switching according to an embodiment of the present document.

The audio processing after mode switching performed by the multimode set top box 36 will be described below. As illustrated in FIG. 7, the audio processing after mode switching includes the following steps:

In step S701, a multimode set top box 36 receives a transport stream (including a video code stream and an audio code stream) corresponding to a channel program.

Here, provided that after mode switching, the multimode set top box 36 plays in a main mode a channel program of a service system 2, plays in an auxiliary mode a channel program of a service system 1, and receives time-frequency code streams sent by the service system 1 and the service system 2.

In step S702, whether the channel program corresponding to the received transport stream is the channel program of the service system 2 played in the main mode is judged, if yes, step 703 is performed, otherwise, step S704 is performed.

In step S703, the volume of the transport stream played currently is set to a conventional volume.

In step S704, the volume of the transport stream played currently is set to be mute.

In actual application, the user often concerns about the channel program played in the main mode (e.g., in a full-screen window). If sounds are played when the channel program is played in the auxiliary mode, an influence on viewing the channel program which is played in a full screen will be brought to the user. Therefore, the channel program played in the auxiliary mode is set to be mute to guarantee the user experience to be good.

In summary, in the embodiments of the present document, the effect of simultaneously playing channel programs of multiple service systems in different modes is realized. As compared with the related art, a processing process caused by the mode switching requiring an access to the system again and a processing process of reallocating play resources are saved, and limited resources of the set top box are optimized and utilized; a coordinated and simple mode switching collaboration mode is provided, high-efficiency and rapid switching of channel programs of multiple service systems between different modes can be realized, convenience is provided to users to view different channel programs, mode management in multiple modes (including mode switching and stopping playing a channel program in an auxiliary mode) is supported, the optimization of the functions of the set top box is realized and the user experience is improved.

The embodiment of the present document further provides a computer storage medium storing computer-executable instructions used for executing at least one of the methods provided by the embodiments of the present document, specifically as the methods illustrated in FIG. 1a and/or FIG. 1f; and the computer storage medium may be any mediums such as a mobile storage device, a Read-Only Memory (ROM), a Random Access Memory (RAM), a magnetic disk or a compact disk which can store program codes, alternatively a non-transient storage medium.

The embodiments described above are just preferred embodiments of the present document and are not used for limiting the protection scope of the present document. All modifications made according to the principle of the present document shall be still understood as included in the protection scope of the present document.

What is claimed is:

1. A mode management method, comprising:
a multimode set top box using a first play resource to play in a main mode a channel program of a first service system associated with the main mode by default, and using a second play resource to play in an auxiliary mode a channel program of a second service system associated with the auxiliary mode by default, wherein the number of service systems that are associated with the auxiliary mode by default is one or more;
when receiving a mode switching instruction, keeping the first play resource and the second play resource in a non-released state, and keeping an accessing state with the first service system and an accessing state with the second service system; and
using the first play resource to play in the auxiliary mode the channel program of the first service system, and using the second play resource to play in the main mode the channel program of the second service system.

2. The mode management method according to claim 1, wherein using the first play resource to play in the main mode the channel program of the first service system associated with the main mode by default comprises:
using the first play resource to play in a mode of a full-screen window the channel program of the first service system.

3. The mode management method according to claim 2, wherein, when using the first play resource to play in the auxiliary mode the channel program of the first service system, and using the second play resource to play in the main mode the channel program of the second service system, the method further comprises:
judging whether a channel program corresponding to a current to-be-played transport stream corresponds to the channel program of the second service system which is played in the main mode, and when the channel program corresponding to the current to-be-played transport stream corresponds to the channel program of the second service system which is played in the main mode, setting a volume of the transport stream played currently to a conventional volume; and when the channel program corresponding to the current to-be-played transport stream does not correspond to the channel program of the second service system which is played in the main mode, setting the volume of the transport stream played currently to be mute.

4. A computer storage medium storing computer-executable instructions used for executing the method according to claim 2.

5. The mode management method according to claim 1, wherein using the second play resource to play in the auxiliary mode the channel program of the second service system associated with the auxiliary mode by default comprises:
using the second play resource to play in a mode of a new window in a full-screen window the channel program of the second service system, or play in a mode of splitting a full-screen window the channel program of the second service system, wherein,
a display area of the new window is smaller than a display area of the full-screen window.

6. The mode management method according to claim 5, wherein, when using the first play resource to play in the auxiliary mode the channel program of the first service system, and using the second play resource to play in the main mode the channel program of the second service system, the method further comprises:
judging whether a channel program corresponding to a current to-be-played transport stream corresponds to the channel program of the second service system which is played in the main mode, and when the channel program corresponding to the current to-be-played transport stream corresponds to the channel program of the second service system which is played in the main mode, setting a volume of the transport stream played currently to a conventional volume; and when the channel program corresponding to the current to-be-played transport stream does not correspond to the channel program of the second service system which is played in the main mode, setting the volume of the transport stream played currently to be mute.

7. The mode management method according to claim 1, wherein, when receiving the mode switching instruction, the method further comprises:
   determining that the main mode is associated with the second service system currently, and determining that the auxiliary mode is associated with the first service system currently.

8. The mode management method according to claim 1, wherein, before using the second play resource to play in the auxiliary mode the channel program of the second service system associated with the auxiliary mode by default, the method further comprises:
   receiving a first instruction, wherein the first instruction is used for instructing using the second play resource to play in the auxiliary mode the channel program of the second service system associated with the auxiliary mode by default,
   wherein a triggering mode of the first instruction comprises at least one of the following:
   triggering through a specific key of a remote controller;
   triggering by calling out a setting page of the multimode set top box;
   triggering through a specific key on a front panel of the multimode set top box.

9. The mode management method according to claim 1, wherein a triggering mode of the mode switching instruction comprises at least one of the following:
   triggering through a specific key of a remote controller;
   triggering by calling out a setting page of the multimode set top box;
   triggering through a specific key on a front panel of the multimode set top box.

10. The mode management method according to claim 1, wherein, when using the first play resource to play in the auxiliary mode the channel program of the first service system, and using the second play resource to play in the main mode the channel program of the second service system, the method further comprises:
    judging whether a channel program corresponding to a current to-be-played transport stream corresponds to the channel program of the second service system which is played in the main mode, and when the channel program corresponding to the current to-be-played transport stream corresponds to the channel program of the second service system which is played in the main mode, setting a volume of the transport stream played currently to a conventional volume; and when the channel program corresponding to the current to-be-played transport stream does not correspond to the channel program of the second service system which is played in the main mode, setting the volume of the transport stream played currently to be mute.

11. A computer storage medium storing computer-executable instructions used for executing the method according to claim 1.

12. A multimode set top box, comprising:
    a first play unit, arranged to use a first play resource to play in a main mode a channel program of a first service system associated with the main mode by default, and use a second play resource to play in an auxiliary mode a channel program of a second service system associated with the auxiliary mode by default, wherein the number of service systems that are associated with the auxiliary mode by default is one or more;
    a switching unit, arranged to, when receiving a mode switching instruction, keep the first play resource and the second play resource in a non-released state, and keep an accessing state with the first service system and an accessing state with the second service system; and
    a second play unit, arranged to use the first play resource to play in the auxiliary mode the channel program of the first service system, and use the second play resource to play in the main mode the channel program of the second service system.

13. The multimode set top box according to claim 12, wherein,
    the first play unit is further arranged to use the first play resource to play in a mode of a full-screen window the channel program of the first service system.

14. The multimode set top box according to claim 13, wherein the multimode set top box further comprises:
    a judgment unit arranged to, when the second play unit uses the first play resource to play in the auxiliary mode the channel program of the second service system and uses the second play resource to play in the main mode the channel program of the first service system, judge whether a channel program corresponding to a current to-be-played transport stream corresponds to the channel program of the second service system which is played in the main mode, and when the channel program corresponding to the current to-be-played transport stream corresponds to the channel program of the second service system which is played in the main mode, set a volume of the transport stream played by the second play unit currently to a conventional volume; and when the channel program corresponding to the current to-be-played transport stream does not correspond to the channel program of the second service system which is played in the main mode, set the volume of the transport stream played by the second play unit currently to be mute.

15. The multimode set top box according to claim 12, wherein the first play unit is further arranged to use the second play resource to play in a mode of a new window in a full-screen window the channel program of the second service system, or play in a mode of splitting a full-screen window the channel program of the second service system, wherein,
    a display area of the new window is smaller than a display area of the full-screen window.

16. The multimode set top box according to claim 15, wherein the multimode set top box further comprises:
    a judgment unit arranged to, when the second play unit uses the first play resource to play in the auxiliary mode the channel program of the second service system and uses the second play resource to play in the main mode the channel program of the first service system, judge whether a channel program corresponding to a current to-be-played transport stream corresponds to the channel program of the second service system which is played in the main mode, and when the channel program corresponding to the current to-be-played transport stream corresponds to the channel program of the second service system which is played in the main mode, set a volume of the transport stream played by the second play unit currently to a conventional volume; and when the channel program corresponding to the current to-be-played transport stream does not correspond to the channel program of the second service system which is played in the main mode, set the volume of the transport stream played by the second play unit currently to be mute.

17. The multimode set top box according to claim 12, wherein,
the switching unit is further arranged to, when receiving the mode switching instruction, determine that the main mode is associated with the second service system currently and determine that the auxiliary mode is associated with the first service system currently.

18. The multimode set top box according to claim 12, wherein,
the multimode set top box further comprises:
a receiving unit arranged to receive a first instruction, wherein the first instruction is used for instructing using the second play resource to play in the auxiliary mode the channel program of the second service system associated with the auxiliary mode by default; and trigger the first play unit to use the second play resource to play in the auxiliary mode the channel program of the second service system associated with the auxiliary mode by default,
wherein the first instruction comprises:
a first instruction triggered through a specific key of a remote controller;
a first instruction triggered by calling out a setting page of the multimode set top box;
a first instruction triggered through a specific key on a front panel of the multimode set top box.

19. The multimode set top box according to claim 12, wherein the mode switching instruction comprises:
a mode switching instruction triggered through a specific key of a remote controller;
a mode switching instruction triggered by calling out a setting page of the multimode set top box;
a mode switching instruction triggered through a specific key on a front panel of the multimode set top box.

20. The multimode set top box according to claim 12, wherein the multimode set top box further comprises:
a judgment unit arranged to, when the second play unit uses the first play resource to play in the auxiliary mode the channel program of the second service system and uses the second play resource to play in the main mode the channel program of the first service system, judge whether a channel program corresponding to a current to-be-played transport stream corresponds to the channel program of the second service system which is played in the main mode, and when the channel program corresponding to the current to-be-played transport stream corresponds to the channel program of the second service system which is played in the main mode, set a volume of the transport stream played by the second play unit currently to a conventional volume; and when the channel program corresponding to the current to-be-played transport stream does not correspond to the channel program of the second service system which is played in the main mode, set the volume of the transport stream played by the second play unit currently to be mute.

* * * * *